(12) United States Patent
Zhang

(10) Patent No.: US 11,871,110 B2
(45) Date of Patent: Jan. 9, 2024

(54) SINGLE IMAGE ULTRA-WIDE FISHEYE CAMERA CALIBRATION VIA DEEP LEARNING

(71) Applicant: INTEL CORPORATION, Santa Clara, CA (US)

(72) Inventor: Fan Zhang, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 732 days.

(21) Appl. No.: 16/869,209

(22) Filed: May 7, 2020

(65) Prior Publication Data

US 2020/0267310 A1 Aug. 20, 2020

(51) Int. Cl.
*H04N 23/67* (2023.01)
*G06T 7/80* (2017.01)
*G06T 5/00* (2006.01)
*H04N 23/698* (2023.01)
*G06T 3/00* (2006.01)
*G06T 3/40* (2006.01)

(52) U.S. Cl.
CPC ......... *H04N 23/67* (2023.01); *G06T 3/0018* (2013.01); *G06T 3/4046* (2013.01); *G06T 5/006* (2013.01); *G06T 7/80* (2017.01); *H04N 23/698* (2023.01); *G06T 2207/20084* (2013.01)

(58) Field of Classification Search
CPC .... H04N 23/67; H04N 23/698; H04N 23/617; G06T 3/0018; G06T 3/4046; G06T 5/006; G06T 7/80; G06T 2207/20084; G06T 2207/10024; G06T 2207/20132; G06T 2207/20081; G06T 3/00; G06T 3/40; G06N 3/045

USPC ................... 348/36, 180, 187, 188
See application file for complete search history.

(56) References Cited

U.S. PATENT DOCUMENTS 7,308,131 B2 * 12/2007 Lelescu ..................... G06T 7/80
382/293
2022/0198710 A1 * 6/2022 Kuang ....................... G06T 7/80

FOREIGN PATENT DOCUMENTS

EP 3136340 A1 * 3/2017

OTHER PUBLICATIONS

Fukuda et al., "Fisheye stereo camera using equirectangular images", 2016 11th France-Japan & 9th Europe-Asia Congress on Mechatronics (MECATRONICS) /17th International Conference on Research and Education in Mechatronics (REM), Jun. 2016, pp. 284-289 (Year: 2016).*
Fukuda et al., "Improving the accuracy of a fisheye stereo camera with a disparity offset map", 2018 12th France-Japan and 10th Europe-Asia Congress on Mechatronics, Sep. 2018, pp. 94-97 (Year: 2018).*

(Continued)

*Primary Examiner* — Albert H Cutler
(74) *Attorney, Agent, or Firm* — Essential Patents Group, LLP

(57) ABSTRACT

Techniques related to calibrating fisheye cameras using a single image are discussed. Such techniques include applying a first pretrained convolutional neural network to an input fisheye image to generate camera model parameters excluding a principle point and applying a second pretrained convolutional neural network to the fisheye image and a difference of the fisheye image and a projection of the fisheye image using the camera model parameters to generate the principle point.

20 Claims, 8 Drawing Sheets

(56) References Cited

OTHER PUBLICATIONS

Bogdan, O. et al., "DeepCalib: a deep learning approach for automatic intrinsic calibration of wide field-of-view cameras", 15th ACM SIGGRAPH European Conference on Visual Media Production; p. 6; Dec. 13, 2018.
He, K et al., "Deep Residual Learning for Image Recognition", IEEE Conference on Computer Vision and Pattern Recognition, 2016, 9 pages.
Hold-Geoffroy, Y. et al., "A perceptual measure for deep single image camera calibration", IEEE Conference on Computer Vision and Pattern Recognition; pp. 2354-2363; 2018.
Huang, et al., "Densely Connected Convolutional Networks", IEEE Conference on Computer Vision and Pattern Recognition (CVPR); 2017, 9 pages.
Ilg, E. et al., "Flownet 2.0: Evolution of optical flow estimation with deep networks", IEEE Conference on Computer Vision and Pattern Recognition; pp. 2462-2470; 2017.
Kang, SB, "Catadioptric self calibration", IEEE Conference on Computer Vision and Pattern Recognition (CVPR 2000); vol. 1; pp. 201-207; Jun. 15, 2000.
Mei, C. et al., "Single view point omnidirectional camera calibration from planar grids", Proceedings of IEEE International Conference on Robotics and Automation; Apr. 10, 2007; pp. 3945-3950.
Micusik, B. et al., "Estimation of omnidirectional camera model from epipolar geometry", 2003 IEEE Computer Society Conference on Computer Vision and Pattern Recognition; vol. 1, pp. 1-1; Jun. 18, 2003.
Rong, J. et al., "Radial lens distortion correction using convolutional neural networks trained with synthesized images", Asian Conference on Computer Vision; pp. 35-49; Nov. 20, 2016.
Scaramuzza, D. et al., "A flexible technique for accurate omnidirectional camera calibration and structure from motion", In Fourth IEEE International Conference on Computer Vision Systems (ICVS '06); Jan. 4, 2006.
Workman, S. et al., "Deepfocal: A method for direct focal length estimation", 2015 IEEE International Conference on Image Processing (ICIP); pp. 1369-1373; Sep. 27, 2015.
Yin, X. et al., "Fisheyerecnet: A multi-context collaborative deep network /AC/ for fisheye image rectification", European Conference on Computer Vision (ECCV); pp. 469-484; 2018.
Communication pursuant to Article 94(3) EPC for European Patent Application No. 20216303.6, dated Nov. 8, 2022.
Extended European Search Report for European Patent Application No. 20216303.6, dated Jun. 17, 2021.
Xue, Z., et al., "Learning to Calibrate Straight Lines for Fisheye Image Rectification", 2019 IEEE/CVF Conference on Computer Vision and Pattern Recognition (CVPR), Jun. 15, 2019, pp. 1643-1651.

* cited by examiner

SINGLE IMAGE ULTRA-WIDE FISHEYE CAMERA CALIBRATION VIA DEEP LEARNING

BACKGROUND

Images and video attained from ultra-wide fisheye lenses are used in a variety of contexts including panorama image making, virtual reality content generation, video surveillance systems, autonomous driving solutions, advanced driver assistance systems (ADAS), and more. Some current fisheye lens calibration techniques rely on capturing multiple calibration images using calibration targets such as checkerboards to extract image features and estimate camera parameters. Although such calibration target techniques provide accurate calibration results, they require users to attain a sequence of images using the calibration target at different viewpoints, which is time-consuming and difficult to apply in practice, particularly for amateur users. Furthermore, automatic image feature extraction for images attained using ultra-wide fisheye lenses is often inaccurate, requiring user input for more accurate feature extraction. Self-calibration methods are more convenient than calibration target calibration methods but have a variety of limitations including relying on feature correspondence between images, which requires a captured image sequence to be high quality for good feature correspondences with images with large textureless regions providing inaccurate calibration results. Again, such techniques are difficult to apply in practice in real world applications.

Therefore, current fisheye lens calibration techniques are inadequate in terms of ease of use and quality. It is with respect to these and other considerations that the present improvements have been needed. Such improvements may become critical as the desire to generate and manipulate content attained from ultra-wide fisheye lenses for use in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
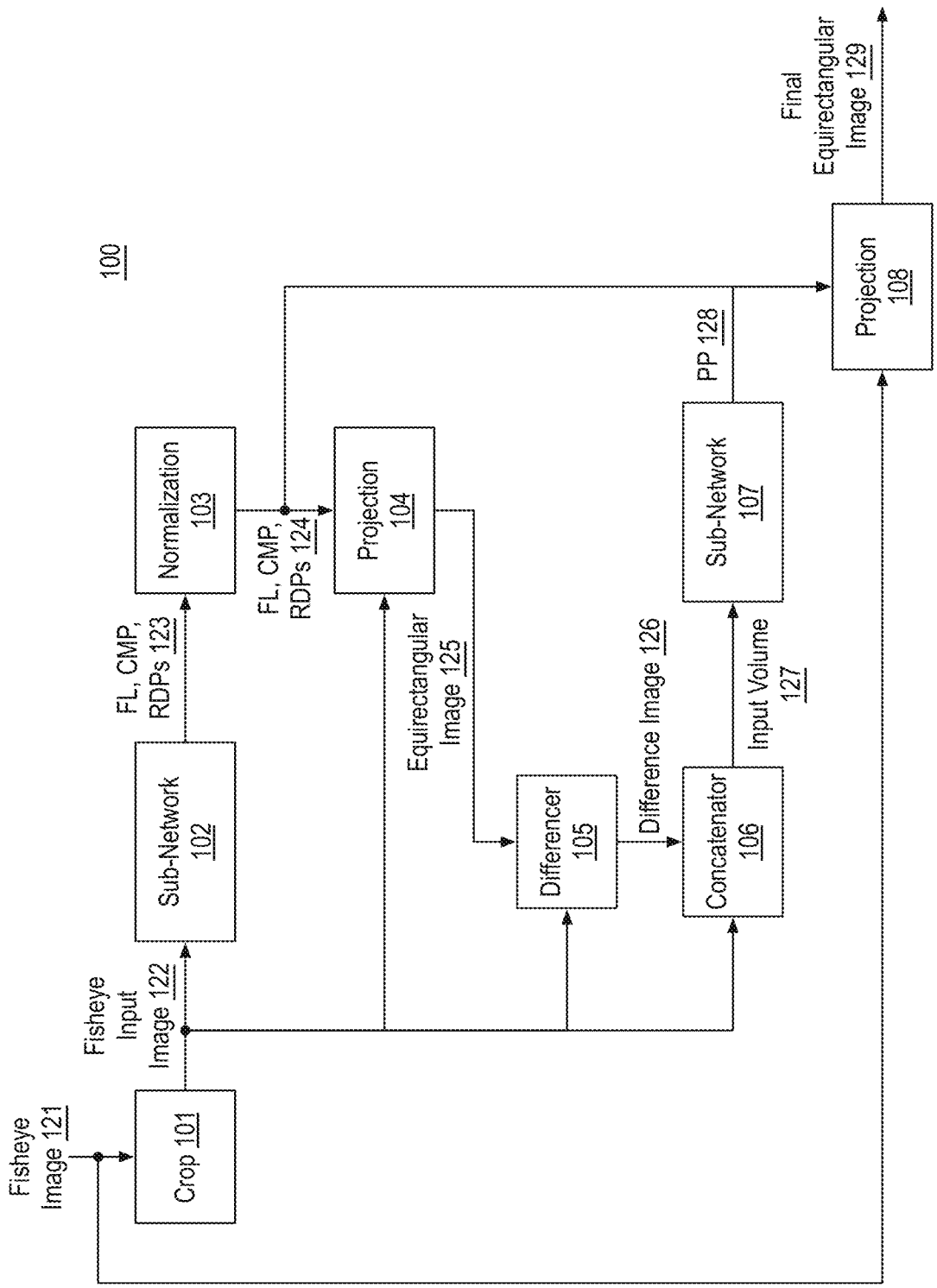
FIG. 1 illustrates an example deep learning system for generating camera model parameters and a reprojected equirectangular image based on a received fisheye image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to calibration for fisheye cameras using a single fisheye image and, in particular, to using deep learning to perform single image calibration of a fisheye camera model.

As described above, in some contexts, it is desirable to perform fisheye lens calibration for a fisheye image of a scene. Notably, camera model parameters from the calibration can be used in a variety of applications including projecting a fisheye image to an equirectangular image. Resultant equirectangular images have use in a variety of contexts such as panorama image making, virtual reality content generation, video surveillance systems, autonomous driving solutions, advanced driver assistance systems (ADAS), and many more. Therefore, high quality camera model parameters and equirectangular images based on captured fisheye images are highly desirable.

In some embodiments, a fisheye image is attained from a fisheye image source such as a fisheye camera system. As used herein the term fisheye image indicates an image captured or generated based on a fisheye view of a scene (e.g., using or corresponding to a fisheye lens having a field of view of not less than 120 degrees and, ideally, not less than 180 degrees). For example, the techniques discussed herein preserve the content of the fisheye image if the field of view is less than or equal to 180 degrees and, if the field of view is greater than 180 degrees, the content may be cropped to 180 degrees. The fisheye image may be in any suitable format or projection format. The term equirectangular image indicates a projection from the fisheye image onto an equirectangular image plane and the equirectangular image may also be in any suitable format. Notably, the fisheye image corresponds to a fisheye camera used to attain the fisheye image.

The fisheye camera system used to attain the fisheye image may be modeled using a unified camera model having a focal length, a unified camera model parameter, one or more radial distortion parameters, and a principle point. Such parameters define the unified camera model and the model parameters may be used to map between pixels on an image plane and locations in 3D space as well as in other applications such as projecting the fisheye image to an equirectangular image and others. For example, once a camera model is defined and parameterized, it may be used in a variety of image manipulation applications, image evaluation applications, image feature mapping applications, etc.

In some embodiments, the received fisheye image is cropped to a shape suitable for a pretrained deep learning network and/or to remove vignetting artifacts from the received fisheye image. The resultant input fisheye image is then provided as an input volume (e.g., a volume of a first pretrained sub-network that estimates the focal length, unified camera model parameter, and one or more radial distortion parameters of the unified camera model). Notably, the first pretrained sub-network does not estimate the principle point of the unified camera model. In some embodiments, the first pretrained sub-network is a dense convolutional neural network with skip connections and a final section employing a sigmoid unit and global average pooling as discussed further herein. The focal length, unified camera model parameter, and one or more radial distortion parameters are then used to project the input fisheye image to an equirectangular image. The input fisheye image and the equirectangular image are differenced to generate a difference image.

The input fisheye image and the difference image are then concatenated to generate a second input volume that is provided to a second pretrained sub-network. The second pretrained sub-network generates the principle point of the unified camera model. In some embodiments, the second pretrained sub-network is an encoder-decoder convolutional neural network having a final section employing a sigmoid unit and global average pooling as discussed further herein. Notably, separating generation of the focal length, unified camera model parameter, and one or more radial distortion parameters and generation of the principle point between sub-networks of differing types and with differing input layers has been found to improve unified camera model parameter accuracy using a single fisheye image.

The resultant unified camera model parameters (e.g., focal length, unified camera model parameter, radial distortion parameters, and principle point) may be output for use in a variety of contexts as well as applied to the received fisheye image (e.g., the fisheye image prior to cropping and/or resizing operations are performed) to generate an equirectangular image corresponding to the received fisheye image. The resultant unified camera model parameters and equirectangular images using such techniques have been found to be adequate when compared to calibration target techniques while offering improved ease of use as calibration is based on attained images without need for a separate calibration routine.

Thereby, the discussed techniques provide a deep learning based fully convolutional single fisheye image calibration and reprojection neural network that determines a full set of intrinsic unified camera model parameters (e.g., principle point, generalized focal length, characteristic parameter of the unified camera model, radial distortion parameters) for cameras with ultra-wide fisheye lenses and reprojects the single fisheye image to an equirectangular image to preserve the large field of view. The single image fisheye calibration network discussed herein may attain any circular fisheye image as an input for calibration and reproject the fisheye content to an equirectangular plane with structural similarity compared to ground truth results generated using calibration target techniques.

FIG. 1 illustrates an example deep learning system 100 for generating camera model parameters and a reprojected equirectangular image based on a received fisheye image, arranged in accordance with at least some implementations of the present disclosure. As shown in FIG. 1, system 100 includes a image cropping module 101, a sub-network 102, a normalization module 103, a projection module 104, a differencer 105, a concatenator 106, a sub-network 107, and a projection module 108. As shown, deep learning system 100 includes two sub-networks: sub-network 102 to generate a focal length (FL), a unified camera model parameter (CMP), and radial distortion parameters (RDPs) 123, characterized collectively as unified camera model parameters, based on an input volume including a fisheye input image 122 and sub-network 107 to generate a principle point (PP) 128 based on an input volume including fisheye input image 122 and a difference image 126. Notably, principle point 128 is also a unified camera model parameter and therefore focal length, unified camera model parameter, and radial distortion parameters 123 may be characterized as a subset of unified camera model parameters, a portion of unified camera model parameters, etc.

Deep learning system 100 attains a fisheye image 121 of a scene and ultimately generates a set of unified camera model parameters and/or a final equirectangular image 129. In an embodiment, a fisheye camera (not shown) of system 100 captures a fisheye image of a scene to provide fisheye image 121. In some embodiments, fisheye image 121 is attained from memory, another device, etc. System 100 may be implemented in any suitable form factor device such as a personal computer, a laptop computer, a tablet, a phablet, a smart phone, a digital camera, a gaming console, a wearable device, a display device, a virtual reality headset, etc.

As shown, fisheye image 121 is received by image cropping module 101, which optionally crops fisheye image 121 to a fisheye input image 122 having shape expected by the other components of system 100. For example, sub-networks 102, 107 may be trained on a particular shape of fisheye image and image cropping module 101 may crop fisheye image 121 to the particular size. In some embodiments, fisheye image 121 is cropped to a square shape fisheye input image 122. For example, a raw captured fisheye input image 121 with arbitrary resolution often includes vignetting artifacts and the cropping may remove all vignetting region(s) and provide a resultant square fisheye input image 122 for use by other components of system 100. Alternatively, fisheye image 121 may be received at the particular shape required by the components of system 100. In some embodiments, fisheye input image 122 is a square image although any may be used.

Fisheye input image 122 provides an input volume for sub-network 102. In some embodiments, the input volume is the size (resolution) by the three color channels of fisheye input image 122. Therefore, fisheye input image 122 may provide an input volume or input layer of sub-network 102 that is 3×H×W, which may be characterized as three feature maps (or images) by H×W features (or pixels). In some embodiments, H=W and input image 122 is a square image although any shape may be used. As discussed, in some embodiments, sub-network 102 employs skip connections and fisheye input image 122 is provided to the input layer of sub-network 102 as well as any number (or all) of convolutional layers of sub-network 102.

Prior to discussion of sub-network 102 and other components of deep learning system 100, discussion turns to the camera model characterized by focal length, unified camera model parameter, and radial distortion parameters 123 and principle point 128.

Figure 2:
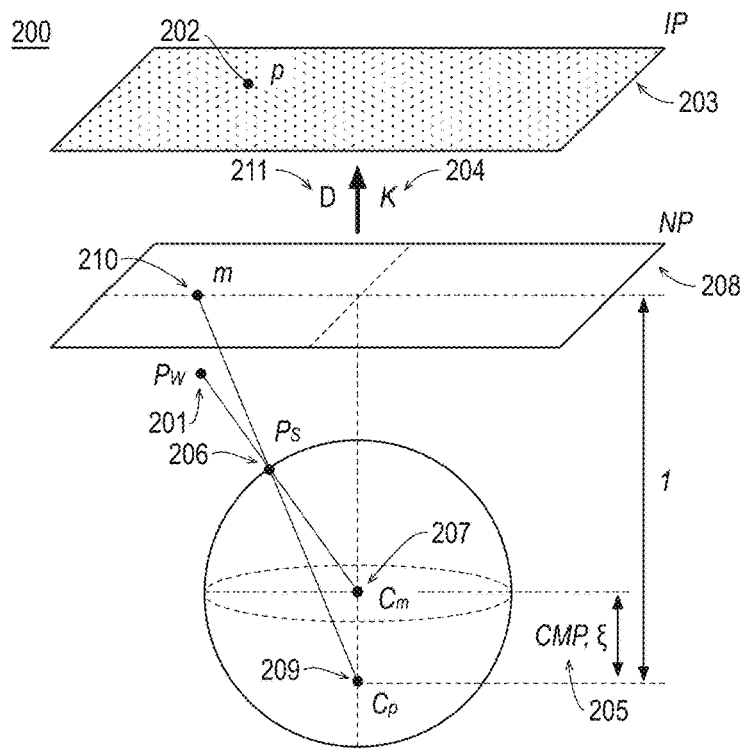
FIG. 2 illustrates an example fisheye unified camera model.

FIG. 2 illustrates an example fisheye unified camera model 200, arranged in accordance with at least some implementations of the present disclosure. As shown in FIG. 2, unified camera model 200 provides a projection from any world point such as world point ($P_W$) 201 to a corresponding projection point such as projection point (p) 202 on an image plane (IP) 203 using a focal length (included in camera intrinsic matrix (K) 204), a unified camera model parameter (CMP, $\xi$) 205, radial distortion parameters (included in distortion model (D) 211), and principle point (included in camera intrinsic matrix (K) 204).

For example, fisheye unified camera model 200 projects 3D points to image plane 203. The techniques discussed herein estimate, using system 100, generate a full set of camera intrinsic parameters including focal length, unified camera model parameter, radial distortion parameters, and principle point for fisheye unified camera model 200. In the context of fisheye unified camera model 200, any world point such as world point ($P_W$) 201 may be projected onto a unit sphere having a unit sphere center ($C_m$) 207, which is centered with respect to image plane (IP) 203 and a normalized plane (IP) 208, at unit sphere point ($P_S$) 206 according to Equations (1) as follows:

$$P_w = (X_w, Y_w, Z_w) \quad (1)$$

$$P_s = (X_s, Y_s, Z_s) = \frac{P_w}{\|P_w\|}$$

where $P_W$ is the world point (having coordinates $X_W$, $Y_W$, $Z_W$) and $P_S$ (having coordinates $X_S$, $Y_S$, $Z_S$) is its projection onto the unit sphere.

Unit sphere point ($P_S$) 206 is then changed to a new reference frame based on unified camera model parameter (CMP, $\xi$) 205, which may be characterized as a reference frame offset, a reference frame parameter, a reference frame difference, etc. and provides a reference frame change or translation in fisheye unified camera model 200 that translates unit sphere point ($P_S$) 206 to a projected point ($P_P$) (not shown) in accordance with unit sphere translation (Cp) 209 according to Equations (2):

$$C_p = (0,0,\xi)$$

$$P_P = (X_S, Y_S, Z_S + \xi) \quad (2)$$

where $C_p$ provides a reference frame change or translation based on unified camera model parameter (CMP, $\xi$) 205 and $P_P$ is the translation of unit sphere point ($P_S$) 206 (having coordinates $X_S$, $Y_S$, $Z_S+\xi$).

The projected point ($P_P$) is then projected onto normalized plane (IP) 208 at a normalized plane projection point (m) 210 in accordance with Equation (3):

$$m = \left(\frac{X_s}{Z_s + \xi}, \frac{Y_s}{Z_s + \xi}, 1\right) \quad (3)$$

where m is the normalized plane projection point.

Finally, normalized plane projection point (m) 210 is projected to projection point (p) 202 on image plane (IP) 203 using camera intrinsic matrix (K) 204 (or camera projection matrix) and distortion model (D) 211 in accordance with Equations (4):

$$p = Km \quad (4)$$

$$K = \begin{bmatrix} f & 0 & u \\ 0 & f & v \\ 0 & 0 & 1 \end{bmatrix}$$

$$D(\rho) = 1 + k_1\rho^2 + k_2\rho^4 + k_3\rho^6$$

where p is the projection point of the world point $P_W$ onto the image plane (IP), K is the camera intrinsic matrix or camera projection matrix that includes the focal length f and principle point (u, v), and D applies radial distortion using radial distortion parameters $k_1$, $k_2$, $k_3$ and based on ρ, a function of distance from image center.

Thereby, fisheye unified camera model 200 provides a model of projection between world points and points on an image plane. The full set of characteristic parameters including focal length (f), unified camera model parameter (ξ), radial distortion parameters ($k_1$, $k_2$, $k_3$), and principle point (u, v) define the projection model (with focal length and principle point being implemented using the camera projection matrix). Such parameters may also be used to manipulate a fisheye image including projection to an equirectangular image and others.

Returning to FIG. 1, as discussed, fisheye input image 122 provides an input volume for sub-network 102, which is pretrained to translate fisheye input image 122 to focal length, unified camera model parameter, and radial distortion parameters 123, as discussed with respect to FIG. 2. Sub-network 102 may include any suitable convolutional neural network (CNN) having any number of convolutional layers and related layers. As used herein, the term CNN indicates a pretrained deep learning neural network including an input layer, multiple hidden layers, and an output layer such that the hidden layers include one or more of convolutional layers each including at least a convolutional layer (and optionally including, for example, a leaky RELU layer, a pooling or summing layer, and/or a normalization layer).

Sub-network 102 is pretrained to output focal length, unified camera model parameter, and radial distortion parameters 123 as discussed further below. As shown, focal length, unified camera model parameter, and radial distortion parameters 123 may be normalized via normalization module 103 to provide focal length, unified camera model parameter, and radial distortion parameters 124 within particular ranges. In some embodiments, such normalization operations as performed by normalization module 103 may be not be employed and sub-network 102 may output normalized parameters.

Figure 3:
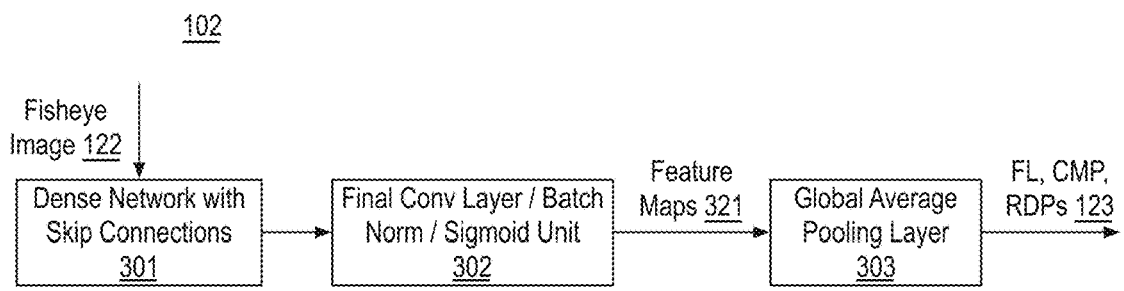
FIG. 3 illustrates an example sub-network for generating a focal length, a unified camera model parameter, and radial distortion parameters for a unified camera model based on a fisheye image input volume.

FIG. 3 illustrates an example sub-network 102 for generating a focal length, a unified camera model parameter, and radial distortion parameters for a unified camera model based on a fisheye image input volume, arranged in accordance with at least some implementations of the present disclosure. As shown in FIG. 3, sub-network 102 may include a dense network with skip connections 301, a final convolutional (cony) layer, batch normalization (norm) and sigmoid unit 302, and a global average pooling layer 303.

As discussed with respect to FIG. 1, sub-network 102 receives fisheye input image 122. A first part of sub-network 102, dense network with skip connections 301 applies a series of sub-units each including the following: a convolutional layer, a batch normalization layer following the convolutional layer, and a leaky rectified linear unit (leaky ReLU) layer following the batch normalization layer. The convolutional layer applies any number of convolutional kernels to generate any number of feature maps, to which batch normalization and a leaky ReLU are applied. The resultant feature maps are fed to the next sub-unit along with fisheye input image 122 and the feature maps from any prior sub-units. That is, each sub-unit receives fisheye input image 122 and feature maps from all preceding sub-units such that skip connections are provided. In some embodiments, the skip connections are provided by concatenating fisheye input image 122 and the available feature maps.

As shown, after dense network with skip connections 301, final convolutional layer, batch normalization, and sigmoid unit 302 is provided and includes a final convolutional layer follow by a batch normalization layer that is followed by a sigmoid unit. The input to final convolutional layer, batch normalization, and sigmoid unit 302 may include only the output feature maps from the last sub-unit of dense network with skip connections 301 or fisheye input image 122 concatenated with the outputs from all sub-units of dense network with skip connections 301. Notably, the leaky ReLU layer of the sub-units of dense network with skip connections 301 is replaced by a sigmoid unit, which applies a sigmoid function to generate feature maps 321. In some embodiments, feature maps 321 may have values restricted to the range of [0, 1] and normalization as discussed with respect to normalization module 103 normalizes the resultant parameter values (e.g., focal length, unified camera model parameter, and radial distortion parameters) to their proper ranges.

In some embodiments, feature maps 321 include one feature map for each eventual output parameter. In some embodiments, feature maps 321 include five feature maps, one each for focal length (FL), unified camera model parameter (CMP), and three radial distortion parameters (RDPs: $k_1$, $k_2$, $k_3$). Global average pooling layer 303 receives feature maps 321 and averages the values within each feature map to generate a corresponding output parameter. For example, the values of the focal length feature map are averaged to generate an output focal length, the values of the unified camera model parameter feature map are averaged to generate an output unified camera model parameter, and so on. In some embodiments, therefore, sub-network 102 is a convolutional neural network including a final convolutional layer, followed by a batch normalization layer, followed by a sigmoid unit layer to output a feature map for each of the focal length, the unified camera model parameter, and the radial distortion parameter and a global average pooling layer to average each feature map to generate the focal length, the unified camera model parameter, and the radial distortion parameter. Furthermore, prior to the final convolutional layer, a number of dense network sub-units each to receive a concatenation of fisheye input image 122 (e.g., an input volume) and all feature maps from prior dense network sub-units are provided in sub-network 102.

Returning to FIG. 1, as shown, focal length, unified camera model parameter, and radial distortion parameters 124 and fisheye input image 122 are provide to projection module 104, which uses focal length, unified camera model parameter, and radial distortion parameters 124 to project (or reproject) fisheye input image 122 to an estimated equirectangular image 125. Projection module 104 projects fisheye input image 122 to estimated equirectangular image 125 based on focal length, unified camera model parameter, and radial distortion parameters 124 using techniques known in the art. In some embodiments, the projection uses an image centerpoint of fisheye input image 122 as the principle point in the projection (as an estimated principle point is not provided by sub-network 102).

The resultant estimated equirectangular image 125 and fisheye input image 122 are provided to differencer 105, which differences resultant estimated equirectangular image 125 and fisheye input image 122 to generate a difference image 126. For example, differencer 105 may provide pixel-wise differences of the color channel values between equirectangular image 125 and fisheye input image 122 such that difference image 126 includes three color planes each comprising pixel-wise difference values. Notably, although equirectangular image 125 and fisheye input image 122 have very different content and are largely mismatched, as the objective is to estimate principle point 128, which is the center point of the region of the valid content, the overall content does not matter as the shape of the valid content itself solely indicates the desired principle point.

Difference image 126 and fisheye input image 122 are provided to concatenator 106, which concatenates difference image 126 and fisheye input image 122 to generate an input volume 127 that includes a feature map (or image) corresponding to each color channel of difference image 126 and fisheye input image 122 such that each feature map includes feature values (pixel values or pixel difference values) at the resolution of difference image 126 and fisheye input image 122. In some embodiments, input volume 127 includes six feature maps (or images) each at the input resolution, although any number of feature maps (e.g., 2 if only luma values are used) may be employed. In some embodiments, input volume 127 includes a concatenation of three color channels of fisheye input image 122 and the three color channels of difference image 126.

Sub-network 107 receives input volume 127 and generates, based on its pretraining, principle point 128. In some embodiments, focal length, unified camera model parameter, and radial distortion parameters 124 and principle point 128 may be provided as an output from system 100. Such parameters, along with fisheye image 121 may be used in a variety of contexts. However, it is noted that it may be advantageous for system 100 to provide final equirectangular image 129, as discussed further below.

Sub-network 107 may include any suitable convolutional neural network (CNN) having any number of convolutional layers and related layers. Sub-network 107 is pretrained to output principle point 128 of a unified camera model as discussed with respect to FIG. 2.

Figure 4:
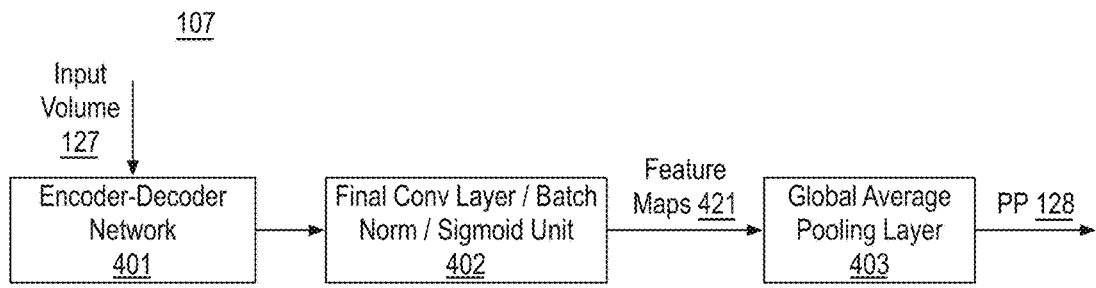
FIG. 4 illustrates an example sub-network for generating a principle point for a unified camera model based on an input volume including a fisheye image and a difference of the fisheye image and an equirectangular image.

FIG. 4 illustrates an example sub-network 107 for generating a principle point for a unified camera model based on an input volume including a fisheye image and a difference of the fisheye image and an equirectangular image, arranged in accordance with at least some implementations of the present disclosure. As shown in FIG. 4, sub-network 107 may include an encoder-decoder network 401, a final convolutional (cony) layer, batch normalization (norm) and sigmoid unit 402, and a global average pooling layer 403.

Sub-network 107 receives input volume 127 as discussed with respect to FIG. 1. Encoder-decoder network 401 of sub-network 107 receives input volume 127 and applies an encoder-decoder CNN architecture to input volume 127 to generate output feature maps (not shown). For example, an encoder portion of encoder-decoder network 401 may extract features at different resolutions from input volume 127 with the effective receptive field (e.g., proportional to the number of consecutive convolution layers) decreasing with decrease in resolution and a decoder portion of encoder-decoder network 401 may combine the extracted features using skip connections from corresponding layers in the encoder portion to move toward an estimation of the principle point for each location of input volume 127.

As shown, after encoder-decoder network 401, final convolutional layer, batch normalization, and sigmoid unit 402 is provided and includes a final convolutional layer follow by a batch normalization layer that is followed by a sigmoid unit, in analogy to final convolutional layer, batch normalization, and sigmoid unit 302 as discussed above. Final convolutional layer, batch normalization, and sigmoid unit 402 receives feature maps from encoder-decoder network 401 and generates feature maps 421. Feature maps 421 include one feature map each for the two axes of the principle point (u, v). Global average pooling layer 403 receives feature maps 421 and averages the values within each feature map to generate principle point 128. In some embodiments, therefore, sub-network 107 employs a convolutional neural network having a final convolutional layer, followed by a batch normalization layer, followed by a sigmoid unit layer to output a feature map for each component of the principle point and a global average pooling layer to average each feature map to generate principle point. Furthermore, sub-network 107 may include, prior to the final convolutional layer, a plurality of encoder convolutional neural network layers followed by a plurality of decoder convolutional neural network layers.

Returning to FIG. 1, focal length, unified camera model parameter, and radial distortion parameters 124 and principle point 128 as well as fisheye image 121 are provided to projection module 108, which uses focal length, unified camera model parameter, radial distortion parameters 124, and principle point 128 to project (or reproject) fisheye image 121 (or fisheye input image 122) to a final equirectangular image 129. Projection module 108 projects fisheye image 121 to final equirectangular image 129 based on focal length, unified camera model parameter, and radial distortion parameters 124 and principle point 128 using techniques known in the art.

Thereby, system 100 determines a full set of camera parameters (e.g., unified camera model parameters) including principle point (u, v), generalized focal length f, characteristic parameter of the unified camera model $\xi$, and distortion parameters $k_1$, $k_2$, $k_3$. Such parameter estimation (e.g., estimation of 7 unified camera model parameters) may be provided via neural network work implemented as a multi-task trainer that implements a stacked architecture including two sub-networks 102, 107. As discussed, sub-network 102 estimates f, $\xi$, and $k_1$, $k_2$, $k_3$ and sub-network 107 estimates (u, v). Such techniques advantageously split the unified camera model parameters into two sets for deep learning based estimation. For example, the parameters and $k_1$, $k_2$, $k_3$ fully fisheye to equirectangular mapping while (u, v) indicates the location of the mapping result. As discussed, f, $\xi$, and $k_1$, $k_2$, $k_3$ are first estimated together using a fisheye image and then used, with an estimate of the principle point as the image center point to warp the fisheye image to an estimated equirectangular image. Sub-network 107 then estimates the actual principle point using a concatenation of the fisheye image and a difference image that is a difference of the fisheye image and the estimated equirectangular image as the input to sub-network 107. As discussed, although the equirectangular image and fisheye image have very different content, in estimation of the true principle point, which is the center point of the region of the valid content, the overall content does not matter as the shape of the valid content itself solely indicates the actual principle point.

Figure 5:
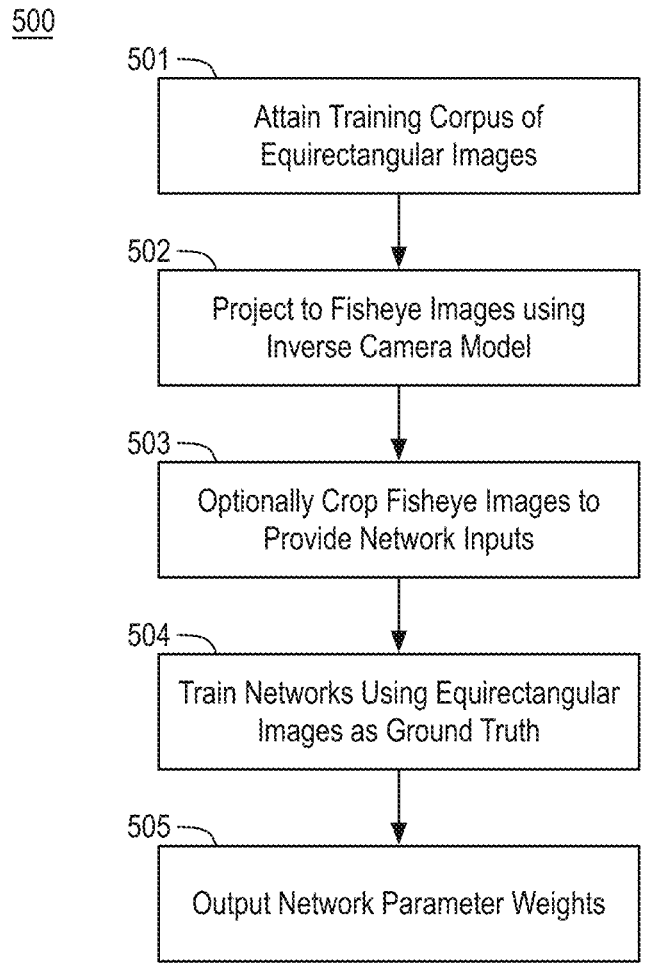
FIG. 5 is a flow diagram illustrating an example process for training sub-networks to generate unified camera model parameters for a fisheye image.

FIG. 5 is a flow diagram illustrating an example process 500 for training sub-networks 102, 107 to generate unified camera model parameters for a fisheye image, arranged in accordance with at least some implementations of the present disclosure. Process 500 may include one or more operations 501-505 as illustrated in FIG. 5. Process 500 may be performed by any device or system discussed herein to train any CNNs (sub-networks) discussed herein. Process 500 or portions thereof may be repeated for any training, training sets, etc. The parameter weights generated by process 500 may be stored to memory and implemented via a processor, for example, to implement sub-networks 102, 107 as discussed herein.

Process 500 begins at operation 501, where a training corpus of equirectangular images are attained. For example, the training corpus may include a number of images such that each is an equirectangular image projected from a fisheye image. Notably, the fisheye image used to generate the equirectangular image may not be available and is not needed. The training corpus may include any number of images such as tens of thousands or hundreds of thousands of images. In some embodiments, sub-networks 102, 107 are trained on a dataset of over 300,000 images with an Adam optimizer, a learning rate of 0.001, and a patch size of 32, although any suitable training conditions may be used. In some embodiments, the training corpus is a collection of 360 panorama images captured using fisheye camera(s) that are randomly cropped to 180×180 field of view content patches from the 360×180 panorama images.

Processing continues at operation 502, where each of the equirectangular images attained at operation 501 are projected from equirectangular images to fisheye images using an inverse camera model (e.g., an inverse of the model used to project from fisheye images to equirectangular images as employed by projection modules 104, 108). During such projection or warping processing, different camera parameters are used to attain a variety of fisheye images. That is, since the camera parameters are not known, a variety of such parameters are used to project from equirectangular images to fisheye images. In some embodiments, the parameters are varied across the training corpus images.

In some embodiments, the inverse camera model to project from fisheye images to equirectangular images at operation 502 is performed as follows. First, 2D image points p=(x, y) on the equirectangular image plane are projected to a normalized image plane as shown in Equation (5):

$$\begin{cases} x' = \dfrac{x - u}{f} \\ y' = \dfrac{y - v}{f} \end{cases} \quad (5)$$

where (x, y) is the image point on the equirectangular image plane, (x', y') is the image point on the a normalized image plane, (u, y) is the principle point, and f is the focal length. Notably, the principle point and the focal length are selected as discussed above.

Next, an inverse radial distortion model is applied to remove radial distortion using an iterative method as shown in Equations (6):

$$\begin{cases} \tilde{x} = x' \\ \tilde{y} = y' \end{cases} \quad (6)$$

(a) $r = \sqrt[2]{\tilde{x}^2 + \tilde{y}^2}$ (b) scale $= 1 + k_1 * r^2 + k_2 * r^4 + k_3 * r^6$ (c) $\begin{cases} \tilde{x} = \dfrac{x'}{\text{scale}} \\ \tilde{y} = \dfrac{y'}{\text{scale}} \end{cases}$ $\begin{cases} x' = \tilde{x} \\ y' = \tilde{y} \end{cases}$ where operations (a), (b), (c) are performed iteratively to attain radial distortion parameters $k_1, k_2, k_3$, which are then used, in turn, to apply the radial distortion model to remove radial distortion in the normalized image plane where (x, y) is the resultant image point on the a normalized image plane.

Then, the image on the normalized image plane, after removal of radial distortion, is reprojected to a point on a sphere through an inverse unified camera model as shown in Equation (7)

$$f^{-1}(p') = \begin{cases} \dfrac{\xi + \sqrt{1 + (1 - \xi^2)(x'^2 + y'^2)}}{x'^2 + y'^2 + 1} x' \\ \dfrac{\xi + \sqrt{1 + (1 - \xi^2)(x'^2 + y'^2)}}{x'^2 + y'^2 + 1} y' \\ \dfrac{\xi + \sqrt{1 + (1 - \xi^2)(x'^2 + y'^2)}}{x'^2 + y'^2 + 1} - \xi \end{cases} \quad (7)$$

where (x, y) is the image point on the a normalized image plane, is the unified camera model, and $f^1$ is the reprojection onto a surface of a sphere.

The points on the sphere surface are then projected to a fisheye image using a spherical projection model. Thereby, equirectangular and fisheye image pairs are provided such that, after resizing, the fisheye image provides a training input to train sub-networks 102, 107 using the corresponding equirectangular image as ground truth.

Processing continues at operation 503, where the fisheye images generated at operation 502 are cropped as needed to provide an input volume. The fisheye images may be cropped to any suitable shape such as a square image as discussed with respect to FIG. 1. Thereby, each cropped fisheye image may provide a 3×H×W input volume (e.g., three color channels by H×W pixels where H=W in some embodiments). In some embodiments, to augment the training set, the fisheye images and equirectangular images are randomly flipped horizontally and/or vertically.

Processing continues at operation 504, where sub-networks 102, 107 are trained using the input fisheye images and the equirectangular images as ground truth. For example, the operations discussed with respect to FIG. 1 may be performed (inclusive of generation of a final equirectangular image) and the resultant final equirectangular image is compared to the ground truth equirectangular image to generate an error or loss, which may be back propagated through sub-networks 102, 107 to update the parameters of sub-networks 102, 107 (e.g., filter weights and other parameters). In an embodiment, an objective function for training is the sum of the Charbonnier loss (e.g., a variant of L1 loss) and image gradient L1 loss, which is optimized using an Adam optimizer using a learning rate of 0.001. However, any suitable training conditions may be used.

Processing continues at operation 505, where the resultant parameter weights of sub-networks 102, 107 are output. For example, the trained parameter weights as well as parameters defining the predefined architectures of sub-networks 102, 107 may be stored to memory and/or transmitted to another device for implementation as discussed herein.

Figure 6:
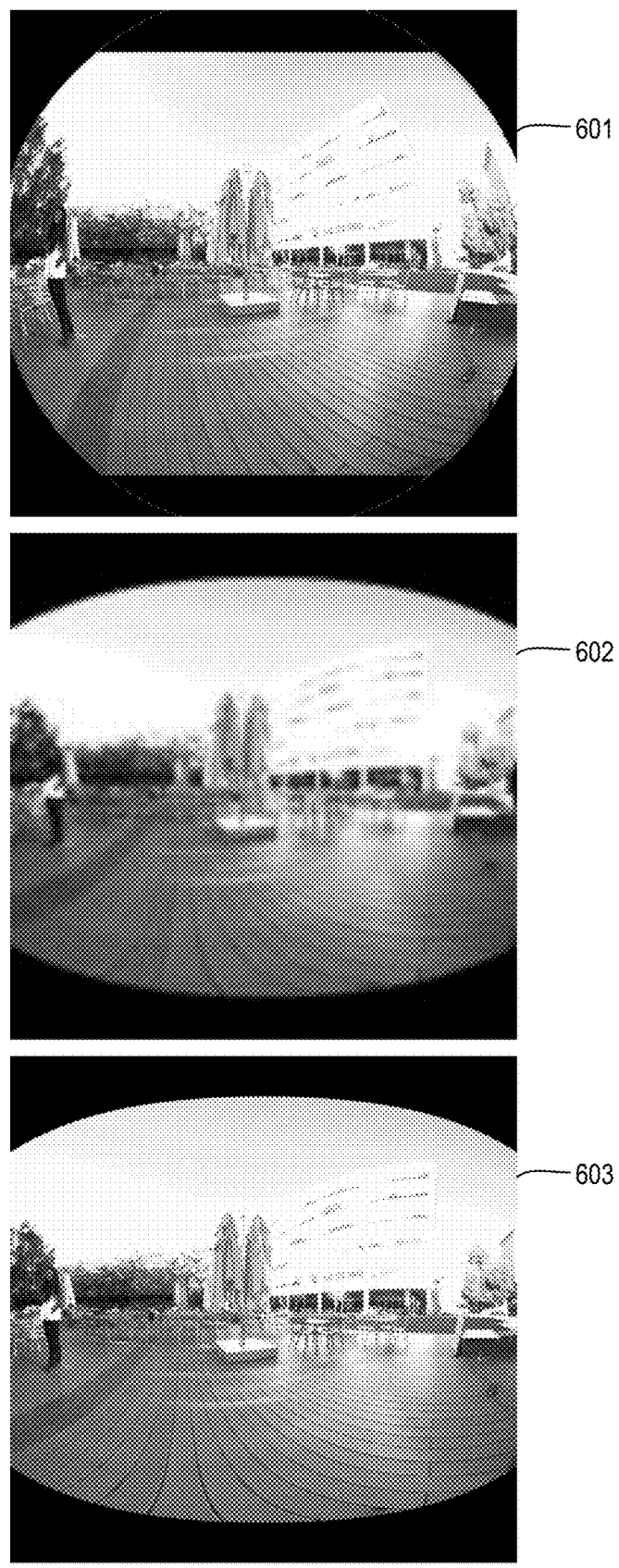
FIG. 6 illustrates an example input fisheye image, a corresponding example output equirectangular image, and a corresponding example ground truth equirectangular image.

FIG. 6 illustrates an example input fisheye image 601, a corresponding example output equirectangular image 602, and a corresponding example ground truth equirectangular image 603, arranged in accordance with at least some implementations of the present disclosure. As shown in FIG. 6, input fisheye image 601 (having significant distortion) is attained for an outdoor environment with objects relatively far from the camera. Using the techniques discussed herein, output equirectangular image 602 is generated, which compares favorably to ground truth equirectangular image 603, which was generated using calibration target calibration methods.

Figure 7:
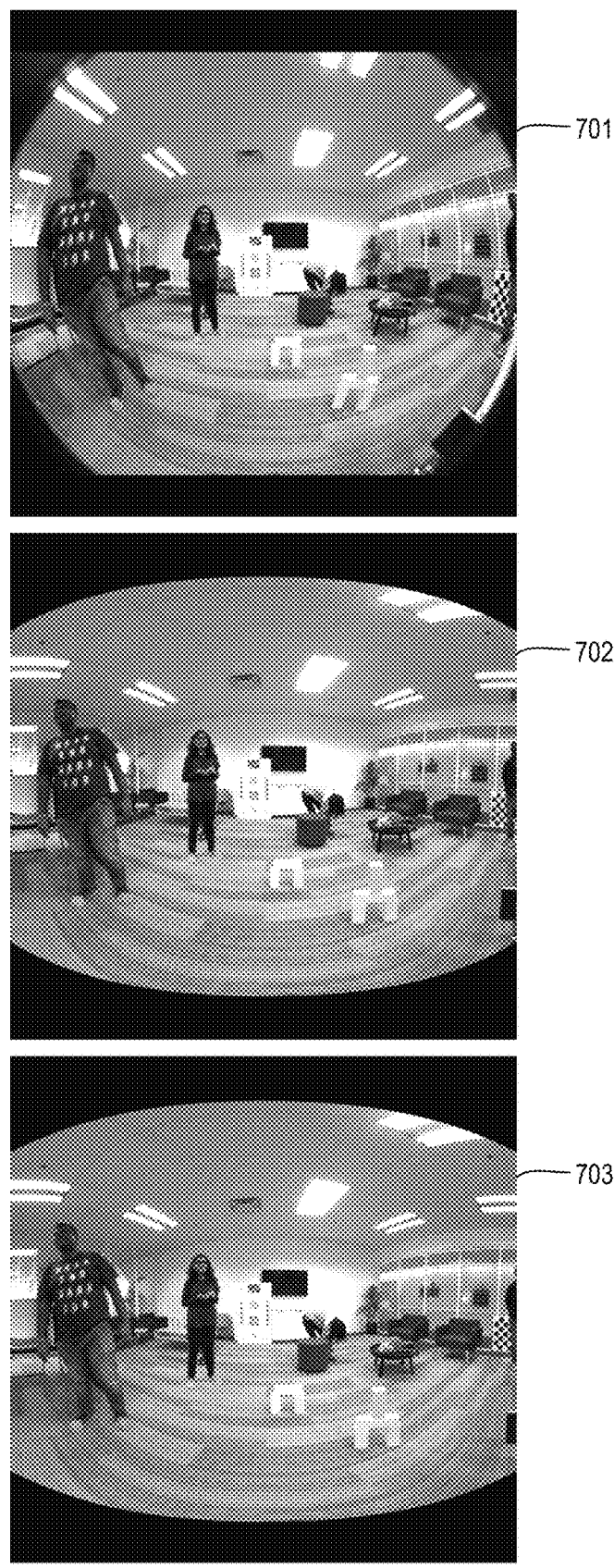
FIG. 7 illustrates another example input fisheye image, a corresponding example output equirectangular image, and a corresponding example ground truth equirectangular image.

FIG. 7 illustrates another example input fisheye image 701, a corresponding example output equirectangular image 702, and a corresponding example ground truth equirectangular image 703, arranged in accordance with at least some implementations of the present disclosure. As shown in FIG. 7, input fisheye image 701 (again having significant distortion) is attained for an indoor scene with objects at a variety of distances from the camera. Using the techniques discussed herein, output equirectangular image 702 is generated, which compares favorably to ground truth equirectangular image 703, which again was generated using calibration target calibration methods. Similar results to those attained in FIG. 6 and FIG. 7 may be provided for a variety of scenes. Quantitatively, equirectangular images attained using the techniques discussed herein attain a structural similarity index (SSIM) 0.73 or more relative to the ground truth equirectangular images.

Figure 8:
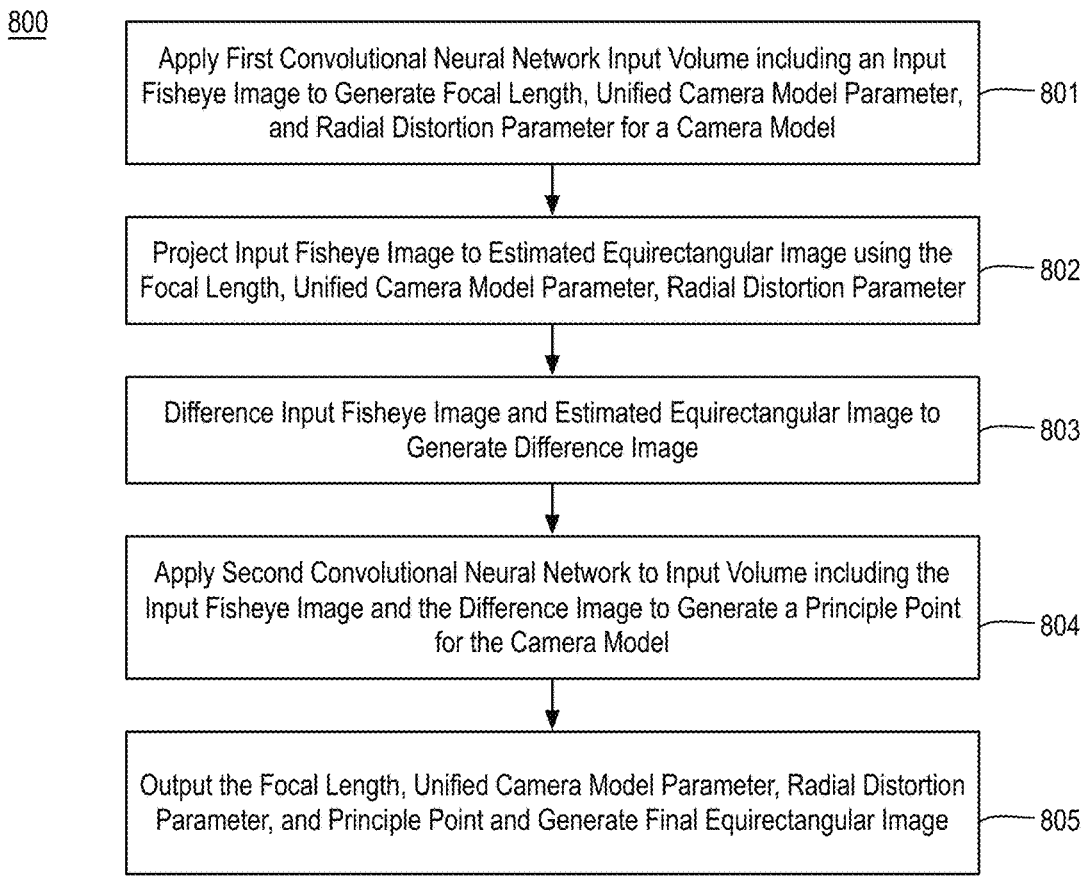
FIG. 8 is a flow diagram illustrating an example process for performing fisheye camera calibration and equirectangular image generation using a fisheye image.

FIG. 8 is a flow diagram illustrating an example process 800 for performing fisheye camera calibration and equirectangular image generation using a fisheye image, arranged in accordance with at least some implementations of the present disclosure. Process 800 may include one or more operations 801-805 as illustrated in FIG. 8. By way of non-limiting example, process 800 may form at least part of a keypoint detection and matching process for fisheye images performed by system 900 as discussed herein. Furthermore, process 800 will be described herein with reference to system 900 of FIG. 9.

Figure 9:
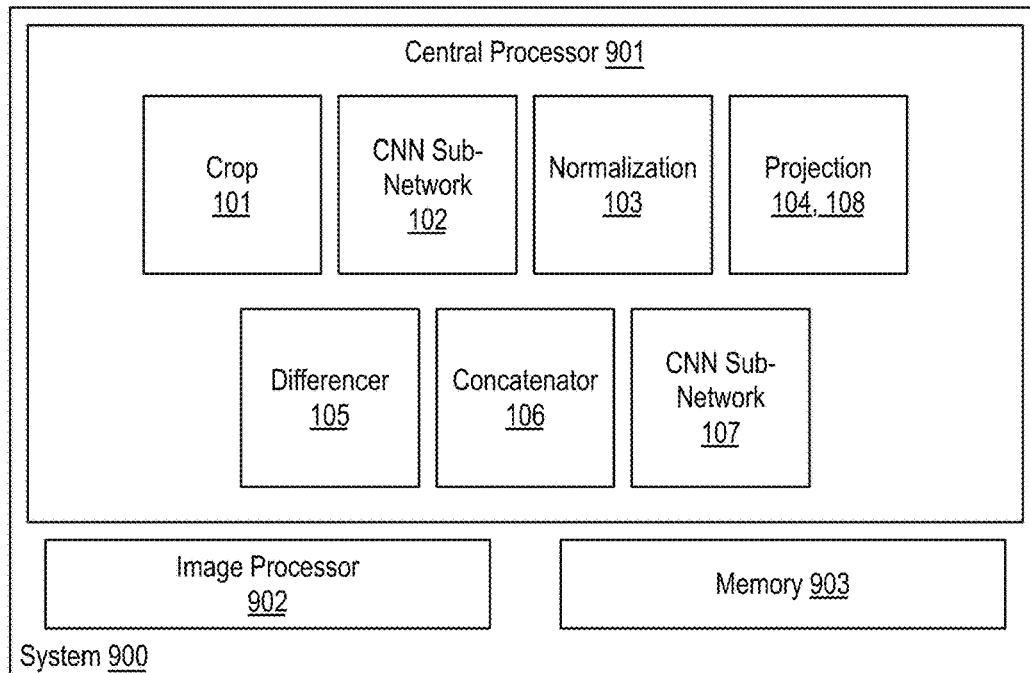
FIG. 9 is an illustrative diagram of an example system for performing fisheye camera calibration and equirectangular image generation using a fisheye image.

FIG. 9 is an illustrative diagram of an example system 900 for performing fisheye camera calibration and equirectangular image generation using a fisheye image, arranged in accordance with at least some implementations of the present disclosure. As shown in FIG. 9, system 900 includes a central processor 901, an image processor 902, and a memory 903. Also as shown, central processor 901 may include or implement image cropping module 101, sub-network 102, normalization module 103, projection module 104, differencer 105, concatenator 106, sub-network 107, and projection module 108. The groupings of such modules in FIG. 9 (e.g., combining projection modules 104, 108) are illustrative of an example embodiment but are not meant to be limiting.

Such components or modules may be implemented to perform operations as discussed herein. Memory 903 may store fisheye images, equirectangular images, CNN parameters and weights, unified camera model parameters, difference image data, or any other data discussed herein. As shown, in some examples, image cropping module 101, sub-network 102, normalization module 103, projection module 104, differencer 105, concatenator 106, sub-network 107, and projection module 108 are implemented via central processor 901. In other examples, one or more or portions of image cropping module 101, sub-network 102, normalization module 103, projection module 104, differencer 105, concatenator 106, sub-network 107, and projection module 108 are implemented via image processor 901, a video processor, a graphics processor, or the like. In yet other examples, one or more or portions of image cropping module 101, sub-network 102, normalization module 103, projection module 104, differencer 105, concatenator 106, sub-network 107, and projection module 108 are implemented via an image or video processing pipeline or unit.

Image processor 902 may include any number and type of graphics, image, or video processing units that may provide the operations as discussed herein. In some examples, image processor 902 may be an image signal processor. Such operations may be implemented via software or hardware or a combination thereof. For example, image processor 902 may include circuitry dedicated to manipulate image data or video data obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of image cropping module 101, sub-network 102, normalization module 103, projection module 104, differencer 105, concatenator 106, sub-network 107, and projection module 108 are implemented via an execution unit (EU) of image processor 902. The EU may include, for example, programmable logic or circuitry such as a logic core or cores that may provide a wide array of programmable logic functions. In an embodiment, one or more or portions of image cropping module 101, sub-network 102, normalization module 103, projection module 104, differencer 105, concatenator 106, sub-network 107, and projection module 108 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of image cropping module 101, sub-network 102, normalization module 103, projection module 104, differencer 105, concatenator 106, sub-network 107, and projection module 108 are implemented via an application specific integrated circuit (ASIC). The ASIC may include an integrated circuitry customized to perform the operations discussed herein.

Returning to discussion of FIG. 8, process 800 begins at operation 801, where a first convolutional neural network is applied to a first input volume including an input fisheye image to generate a focal length, a unified camera model parameter, and a radial distortion parameter for a unified camera model corresponding to a fisheye camera used to attain the input fisheye image. For example, a fisheye image may be attained using a fisheye camera (e.g., a camera with a fisheye lens) and the fisheye image may be cropped and downsized to provide the input fisheye image. The input fisheye image may make up the entirety of the first input volume, which may include three input frames, one for each color channel of the input fisheye image.

The first convolutional neural network may be any suitable convolutional neural network. In some embodiments, the first convolutional neural network includes a number of dense neural network subunits (each with a convolutional layer, a batch normalization layer, and a leaky ReLU layer) followed by a final convolutional layer, a batch normalization layer, and a sigmoid unit layer, which is then followed by a global average pooling layer. In some embodiments, the first convolutional neural network includes a final convolutional layer, followed by a batch normalization layer, followed by a sigmoid unit layer to output a feature map for each of the focal length, the unified camera model parameter, and the radial distortion parameter and a global average pooling layer to average each feature map to generate the focal length, the unified camera model parameter, and the radial distortion parameter. In some embodiments, the first convolutional neural network includes, prior to the final convolutional layer, a number of dense network sub-units each to receive a concatenation of the first input volume and all feature maps from prior dense network sub-units. In some embodiments, a first dense network sub-unit of the dense network sub-units comprises a first convolutional layer, followed by a first batch normalization layer, followed by a first rectified linear unit layer.

Processing continues at operation 802, where the input fisheye image is projected to an estimated equirectangular image using the focal length, the unified camera model parameter, and the radial distortion parameter. The input fisheye image may be projected to the estimated equirectangular image using any suitable technique or techniques. In an embodiment, the input fisheye image is projected to the estimated equirectangular image using the focal length, the unified camera model parameter, the radial distortion parameter, and a an image center as a principle point of the projection model.

Processing continues at operation 803, where the input fisheye image and the estimated equirectangular image are differenced to generate a difference image. The input fisheye image and the estimated equirectangular image may be differenced using any suitable technique or techniques. In some embodiments, the input fisheye image and the estimated equirectangular image are differenced in a pixel-wise and color-channel wise manner. For example, the difference image may include three pixel difference values (one for each of a red channel, a green channel, and a blue channel) for each pixel that are a difference between the value for the input fisheye image and the value for the estimated equirectangular image for the pixel and the color channel.

Processing continues at operation 804, where a second convolutional neural network is applied to a second input volume including the input fisheye image and the difference image to generate a principle point for the camera model. In some embodiments, the unified camera model includes the focal length, the unified camera model parameter, the radial distortion parameter (e.g., three radial distortion parameters), and the principle point. In some embodiments, the unified camera model parameter is a reference frame offset of the unified camera model and a camera projection matrix of the unified camera model includes and implements the focal length and principle point. In some embodiments, the second input volume is a concatenation of three color channels of the input fisheye image and the three color channels of the difference image.

The second convolutional neural network may be any suitable convolutional neural network. In some embodiments, the second convolutional neural network includes an encoder-decoder neural network followed by a final convolutional layer, a batch normalization layer, and a sigmoid unit layer, which is then followed by a global average pooling layer. In some embodiments, the second convolutional neural network includes a final convolutional layer, followed by a batch normalization layer, followed by a sigmoid unit layer to output a feature map for each component of the principle point and a global average pooling layer to average each feature map to generate principle point. In some embodiments, the second convolutional neural network includes, prior to the final convolutional layer, a plurality of encoder convolutional neural network layers followed by a plurality of decoder convolutional neural network layers.

Processing continues at operation 805, where the focal length, the unified camera model parameter, the radial distortion parameter, and the principle point for the unified camera model are output and/or the input fisheye image or a second input fisheye image corresponding to the input fisheye image is projected to a final equirectangular image, which is output to memory. In some embodiments, the final equirectangular image is based on the second input fisheye image. For example, the second input fisheye image may be a full resolution image that is cropped to generate the input fisheye image such that the final equirectangular image is based on the second input fisheye image and the input fisheye image is cropped from the second input fisheye image.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
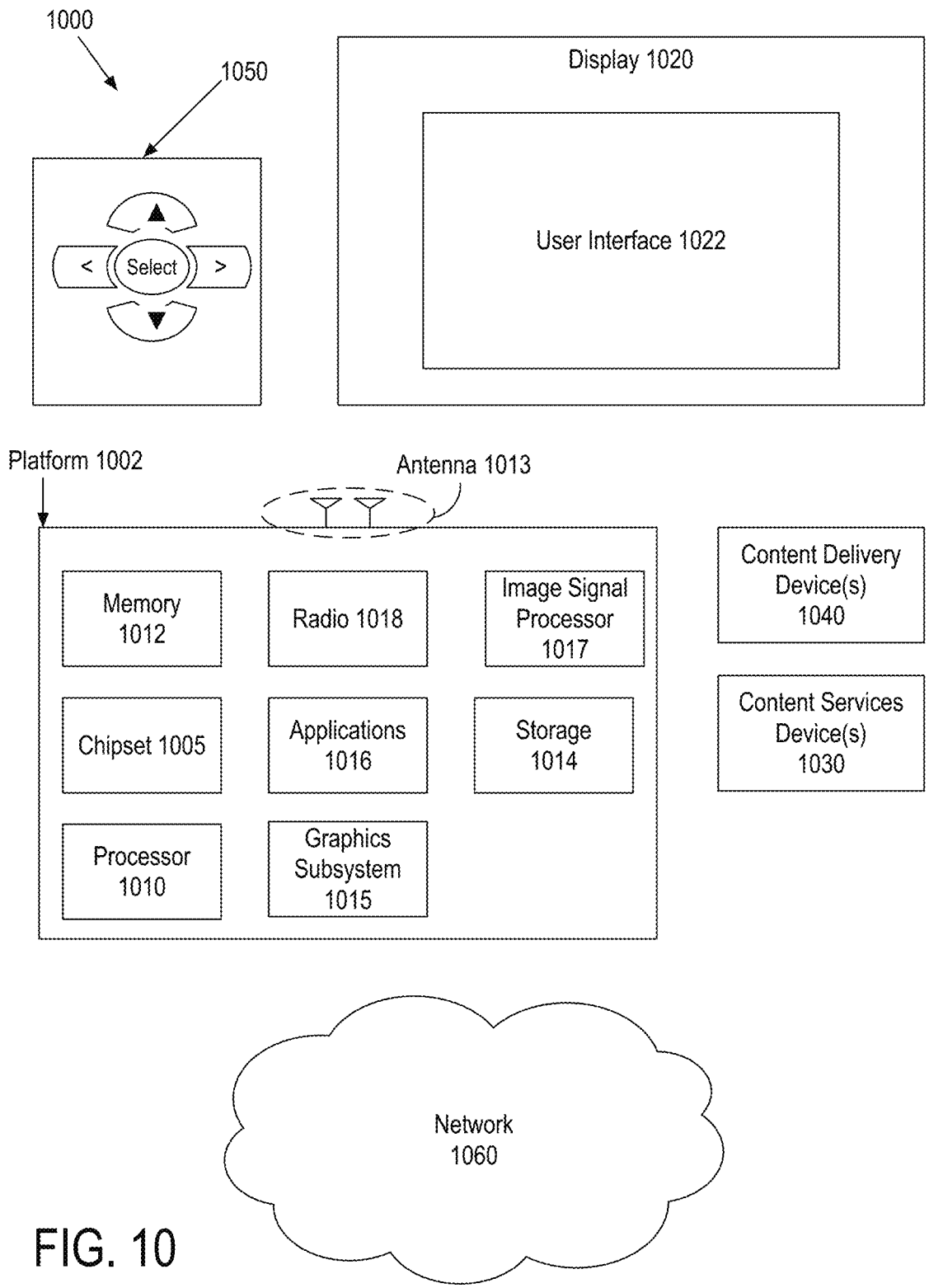
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile interne device (MID), messaging device, data communication device, peripheral device, scanner, printer, multi-function device, and so forth.

In various implementations, system 1000 includes a platform 1002 coupled to a display 1020. Platform 1002 may receive content from a content device such as content services device(s) 1030 or content delivery device(s) 1040. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
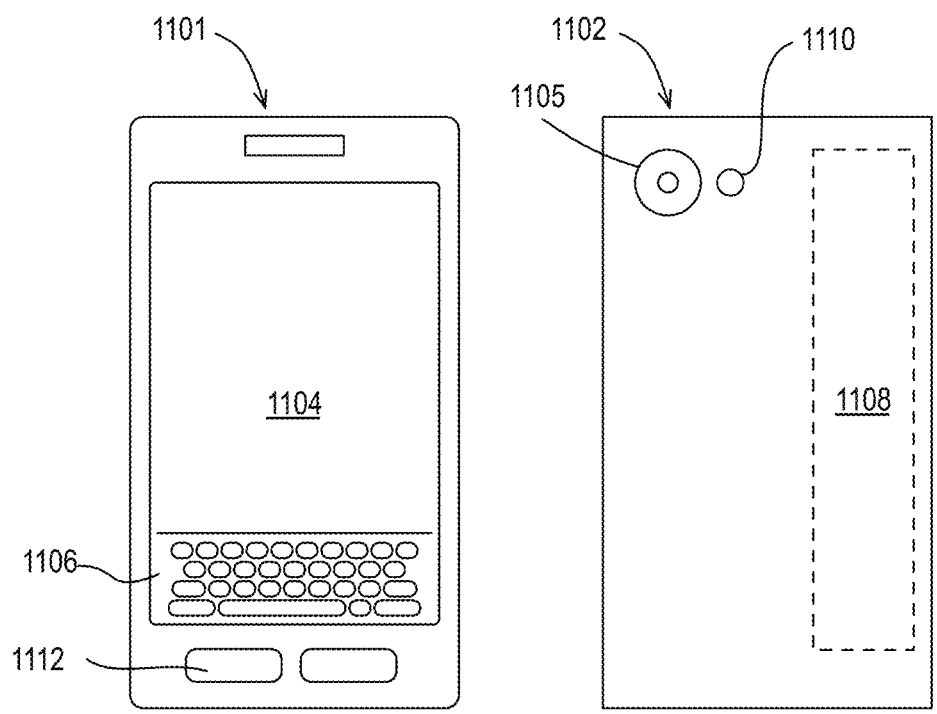
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other devices or systems, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for fisheye camera calibration comprises applying a first convolutional neural network to a first input volume comprising an input fisheye image to generate a focal length, a unified camera model parameter, and a radial distortion parameter for a unified camera model corresponding to a fisheye camera used to attain the input fisheye image, projecting the input fisheye image to an estimated equirectangular image using the focal length, the unified camera model parameter, and the radial distortion parameter, differencing the input fisheye image and the estimated equirectangular image to generate a difference image, applying a second convolutional neural network to a second input volume comprising the input fisheye image and the difference image to generate a principle point for the camera model, and outputting the focal length, the unified camera model parameter, the radial distortion parameter, and the principle point for the unified camera model.

In one or more second embodiments, further to the first embodiment, the method further comprises projecting the input fisheye image or a second input fisheye image corresponding to the input fisheye image to a final equirectangular image and outputting the final equirectangular image to memory.

In one or more third embodiments, further to the first or second embodiments, the final equirectangular image is based on the second input fisheye image and the input fisheye image is cropped from the second input fisheye image.

In one or more fourth embodiments, further to any of the first through third embodiments, the unified camera model parameter comprises a reference frame offset of the unified camera model and a camera projection matrix of the unified camera model comprises the focal length and principle point.

In one or more fifth embodiments, further to any of the first through fourth embodiments, the second input volume comprises a concatenation of three color channels of the input fisheye image and the three color channels of the difference image.

In one or more sixth embodiments, further to any of the first through fifth embodiments, the first convolutional neural network comprises a final convolutional layer, followed by a batch normalization layer, followed by a sigmoid unit layer to output a feature map for each of the focal length, the unified camera model parameter, and the radial distortion parameter and a global average pooling layer to average each feature map to generate the focal length, the unified camera model parameter, and the radial distortion parameter.

In one or more seventh embodiments, further to any of the first through sixth embodiments, the first convolutional neural network comprises, prior to the final convolutional layer, a plurality of dense network sub-units each to receive a concatenation of the first input volume and all feature maps from prior dense network sub-units.

In one or more eighth embodiments, further to any of the first through seventh embodiments, a first dense network sub-unit of the dense network sub-units comprises a first convolutional layer, followed by a first batch normalization layer, followed by a first rectified linear unit layer.

In one or more ninth embodiments, further to any of the first through eighth embodiments, the second convolutional neural network comprises a final convolutional layer, followed by a batch normalization layer, followed by a sigmoid unit layer to output a feature map for each component of the principle point and a global average pooling layer to average each feature map to generate principle point.

In one or more tenth embodiments, further to any of the first through ninth embodiments, the second convolutional neural network comprises, prior to the final convolutional layer, a plurality of encoder convolutional neural network layers followed by a plurality of decoder convolutional neural network layers.

In one or more eleventh embodiments, a device or system includes a memory and a processor to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for fisheye camera calibration comprising:
a memory configured to store an input fisheye image; and
one or more processors coupled to the memory, the one or more processors to:
apply a first convolutional neural network to a first input volume comprising the input fisheye image to generate a focal length, a unified camera model parameter, and a radial distortion parameter for a unified camera model corresponding to a fisheye camera used to attain the input fisheye image;
project the input fisheye image to an estimated equirectangular image using the focal length, the unified camera model parameter, and the radial distortion parameter;
difference the input fisheye image and the estimated equirectangular image to generate a difference image;
apply a second convolutional neural network to a second input volume comprising the input fisheye image and the difference image to generate a principle point for the camera model; and
output the focal length, the unified camera model parameter, the radial distortion parameter, and the principle point for the unified camera model.

2. The system of claim 1, the one or more processors to:
project the input fisheye image or a second input fisheye image corresponding to the input fisheye image to a final equirectangular image; and
output the final equirectangular image to memory.

3. The system of claim 2, wherein the final equirectangular image is based on the second input fisheye image and the input fisheye image is cropped from the second input fisheye image.

4. The system of claim 1, wherein the unified camera model parameter comprises a reference frame offset of the unified camera model and a camera projection matrix of the unified camera model comprises the focal length and principle point.

5. The system of claim 1, wherein the second input volume comprises a concatenation of three color channels of the input fisheye image and the three color channels of the difference image.

6. The system of claim 1, wherein the first convolutional neural network comprises a final convolutional layer, followed by a batch normalization layer, followed by a sigmoid unit layer to output a feature map for each of the focal length, the unified camera model parameter, and the radial distortion parameter and a global average pooling layer to average each feature map to generate the focal length, the unified camera model parameter, and the radial distortion parameter.

7. The system of claim 6, wherein the first convolutional neural network comprises, prior to the final convolutional layer, a plurality of dense network sub-units each to receive a concatenation of the first input volume and all feature maps from prior dense network sub-units.

8. The system of claim 7, wherein a first dense network sub-unit of the dense network sub-units comprises a first convolutional layer, followed by a first batch normalization layer, followed by a first rectified linear unit layer.

9. The system of claim 1, wherein the second convolutional neural network comprises a final convolutional layer, followed by a batch normalization layer, followed by a sigmoid unit layer to output a feature map for each component of the principle point and a global average pooling layer to average each feature map to generate the principle point.

10. The system of claim 9, wherein the second convolutional neural network comprises, prior to the final convolutional layer, a plurality of encoder convolutional neural network layers followed by a plurality of decoder convolutional neural network layers.

11. A method for fisheye camera calibration comprising:
applying a first convolutional neural network to a first input volume comprising an input fisheye image to generate a focal length, a unified camera model parameter, and a radial distortion parameter for a unified camera model corresponding to a fisheye camera used to attain the input fisheye image;
projecting the input fisheye image to an estimated equirectangular image using the focal length, the unified camera model parameter, and the radial distortion parameter;
differencing the input fisheye image and the estimated equirectangular image to generate a difference image;
applying a second convolutional neural network to a second input volume comprising the input fisheye image and the difference image to generate a principle point for the camera model; and
outputting the focal length, the unified camera model parameter, the radial distortion parameter, and the principle point for the unified camera model.

12. The method of claim 11, further comprising:
projecting the input fisheye image or a second input fisheye image corresponding to the input fisheye image to a final equirectangular image; and
outputting the final equirectangular image to memory.

13. The method of claim 11, wherein the second input volume comprises a concatenation of three color channels of the input fisheye image and three color channels of the difference image.

14. The method of claim 11, wherein the first convolutional neural network comprises a plurality of dense network sub-units each to receive a concatenation of the first input volume and all feature maps from prior dense network sub-units, followed by a final convolutional layer, followed by a batch normalization layer, followed by a sigmoid unit layer to output a feature map for each of the focal length, the unified camera model parameter, and the radial distortion parameter and a global average pooling layer to average each feature map to generate the focal length, the unified camera model parameter, and the radial distortion parameter.

15. The method of claim 11, wherein the second convolutional neural network comprises a plurality of encoder convolutional neural network layers followed by a plurality of decoder convolutional neural network layers followed by a final convolutional layer, followed by a batch normalization layer, followed by a sigmoid unit layer to output a feature map for each component of the principle point and a global average pooling layer to average each feature map to generate the principle point.

16. At least one non-transitory machine readable medium comprising a plurality of instructions that, in response to being executed on a device, cause the device to perform fisheye camera calibration by:
applying a first convolutional neural network to a first input volume comprising an input fisheye image to generate a focal length, a unified camera model parameter, and a radial distortion parameter for a unified camera model corresponding to a fisheye camera used to attain the input fisheye image;
projecting the input fisheye image to an estimated equirectangular image using the focal length, the unified camera model parameter, and the radial distortion parameter;
differencing the input fisheye image and the estimated equirectangular image to generate a difference image;
applying a second convolutional neural network to a second input volume comprising the input fisheye image and the difference image to generate a principle point for the camera model; and
outputting the focal length, the unified camera model parameter, the radial distortion parameter, and the principle point for the unified camera model.

17. The non-transitory machine readable medium of claim 16, further comprising a plurality of instructions that, in response to being executed on the device, cause the device to perform fisheye camera calibration by:
projecting the input fisheye image or a second input fisheye image corresponding to the input fisheye image to a final equirectangular image; and
outputting the final equirectangular image to memory.

18. The non-transitory machine readable medium of claim 16, wherein the second input volume comprises a concatenation of three color channels of the input fisheye image and three color channels of the difference image.

19. The non-transitory machine readable medium of claim 16, wherein the first convolutional neural network comprises a plurality of dense network sub-units each to receive a concatenation of the first input volume and all feature maps from prior dense network sub-units, followed by a final convolutional layer, followed by a batch normalization layer, followed by a sigmoid unit layer to output a feature map for each of the focal length, the unified camera model parameter, and the radial distortion parameter and a global average pooling layer to average each feature map to generate the focal length, the unified camera model parameter, and the radial distortion parameter.

20. The non-transitory machine readable medium of claim 16, wherein the second convolutional neural network comprises a plurality of encoder convolutional neural network layers followed by a plurality of decoder convolutional neural network layers followed by a final convolutional layer, followed by a batch normalization layer, followed by a sigmoid unit layer to output a feature map for each component of the principle point and a global average pooling layer to average each feature map to generate the principle point.

* * * * *